Dec. 12, 1950     T. A. HILL     2,533,885
COUPLING
Original Filed March 7, 1944
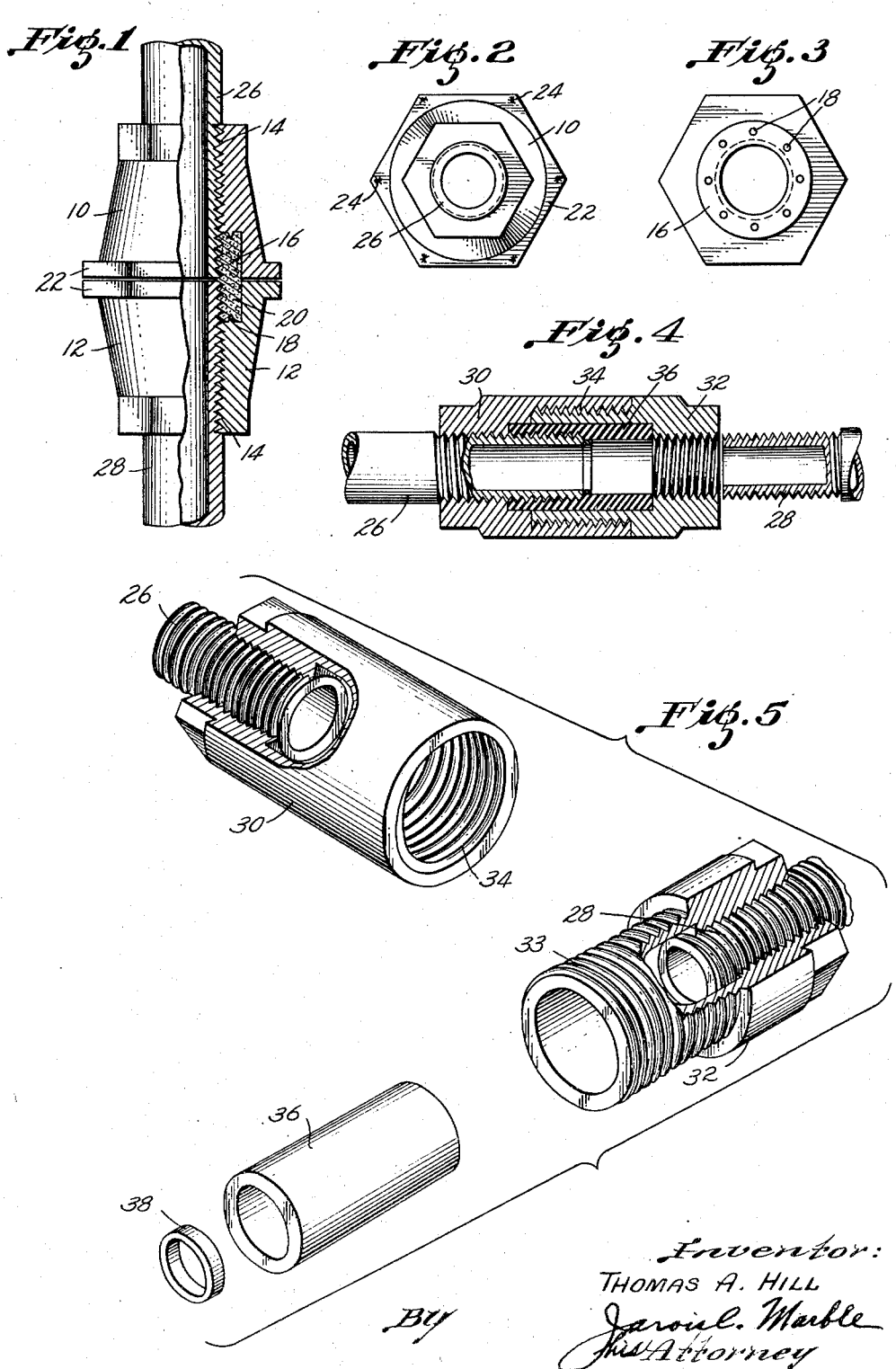
Inventor:
THOMAS A. HILL

Patented Dec. 12, 1950  2,533,885

UNITED STATES PATENT OFFICE 2,533,885

COUPLING

Thomas A. Hill, West Orange, N. J., assignor, by mesne assignments, to Elastic Stop Nut Corporation of America, Union, N. J., a corporation of New Jersey Original application March 7, 1944, Serial No. 525,409. Divided and this application January 10, 1945, Serial No. 572,242

4 Claims. (Cl. 285—154)

The present application is a division of my copending application Serial No. 525,409, filed March 7, 1944, (now abandoned).

This invention relates broadly to improvements in self-locking threaded members and more particularly to self-locking couplings.

By virtue of the self-locking feature the members to be coupled together, such as pipes, will not become loosened unintentionally, as by vibration. Further objects and advantages of my invention will be apparent from the following description considered in connection with the accompanying drawings, which form a part of this specification and of which:

Fig. 1 is a side view, partially in cross-section, of one embodiment of the present invention;

Fig. 2 is a top view of the device shown in Fig. 1;

Fig. 3 is an end view of one of the elements forming part of the device shown in Fig. 1 before said element is assembled with the other elements;

Fig. 4 is a cross-sectional view of another embodiment of my invention; and

Fig. 5 is an exploded view, partially broken away, of the device shown in Fig. 4.

Referring more particularly to Figs. 1 through 3, reference characters 10 and 12 designate two body members. Each body member is formed with a differential bore therethrough, separated by a radial shoulder. The bore portion of smaller diameter is formed with screw threads 14, while the bore portion 16 of larger diameter is formed with a cylindrical or serrated surface. A plurality of projections 18 extend axially from each shoulder into the bore portions 16.

An annular insert 20 of elastic material having an axial length substantially equal to the sum of the lengths of the two bore portions 16 is disposed within these bore portions whereafter the flanges 22 on the body members 10 and 12 are secured together as by spot welding as is indicated at 24. Thus the elastic insert 20 is securely clamped between the shoulders of the two body members and the projections 18 penetrate the insert to restrain it against rotation relative to the body members.

In use, the threaded ends of pipes 26 and 28 first engage the screw threads 14 in the body members and thereafter are advanced into engagement with the elastic insert 20, the threads on the pipe impressing threads in the elastic insert. The resulting deformations of the elastic insert material creates sufficient friction between the coupling and the pipe to prevent unintentional rotation of the pipes relative to the coupling.

The embodiment illustrated in Figs. 4 and 5 differs from that above described primarily in the fact that the body portions 30 and 32 are secured together by means of external screw threads 33 on the member 30, as is indicated at 34. An elastic insert 36 occupies the space provided by the bore portions of larger diameter in the two body members and this insert is securely clamped in place when the body members are screwed together.

If desired, a washer 38 having an exterior diameter substantially equal to the interior diameter of the elastic insert, may be placed within the latter so as to be clamped and form a seal between the ends of the pipes 26 and 28 when the latter are screwed into the coupling.

While I have shown and described two more or less specific embodiments of my invention, it is to be understood that this has been done for purposes of illustration only and that the scope of my invention is not to be limited thereby, but is to be determined from the appended claims.

What is claimed:

1. A threaded coupling comprising a pair of hollow members each having differential bore portions extending inwardly from opposite ends of the member and separated by a shoulder, the smaller bore portion of each member being screw-threaded, means for securing said members together with their larger bore portions in contiguous alignment, and locking means of elastic deformable material retained within said larger bore portions and providing a bore dimensioned to have threads impressed in the elastic material by the threads of externally threaded elements screwed through the smaller bore portions of said hollow member, whereby to elastically grip said elements to prevent their turning relative to said hollow members.

2. A coupling as set forth in claim 1 in which said locking means comprises an annular insert and in which at least one of said members is provided with means engaging the insert to prevent turning of the insert relative to said members.

3. A coupling as set forth in claim 1 in which an annular sealing washer is located within the bore of the locking means to provide a sealing gasket between the confronting ends of the threaded elements screwed into the coupling.

4. A coupling as set forth in claim 1 in which one of said members is provided with an internally threaded socket and the other of said members is provided with an annular externally threaded extension adapted to be screwed into said socket, said extension providing at least the major part of the larger bore portion for receiving the locking means.

THOMAS A. HILL.

REFERENCES CITED

The following references are of record in the file of this patent:

UNITED STATES PATENTS

| Number | Name | Date |
| --- | --- | --- |
| 324,598 | Shelton | Aug. 18, 1885 |
| 1,220,773 | Murray | Mar. 27, 1917 |
| 1,583,126 | Crane | May 4, 1926 |

FOREIGN PATENTS

| Number | Country | Date |
| --- | --- | --- |
| 16,587 | Great Britain | of 1903 |